United States Patent
Hotaka et al.

(10) Patent No.: US 6,180,028 B1
(45) Date of Patent: Jan. 30, 2001

(54) LIQUID-CRYSTAL COMPOSITION AND POLYMERIC LIQUID CRYSTAL OBTAINED BY POLYMERIZING THE SAME

(75) Inventors: Hiroki Hotaka; Tomoki Gunjima; Mitsuru Kurosawa; Hiromasa Sato; Yuzuru Tanabe, all of Yokohama (JP)

(73) Assignee: Asahi Glass Company Ltd., Tokyo (JP)

(*) Notice: Under 35 U.S.C. 154(b), the term of this patent shall be extended for 0 days.

(21) Appl. No.: 09/269,205

(22) PCT Filed: Jul. 30, 1998

(86) PCT No.: PCT/JP98/03406
§ 371 Date: Mar. 31, 1999
§ 102(e) Date: Mar. 31, 1999

(87) PCT Pub. No.: WO99/06501
PCT Pub. Date: Feb. 11, 1999

(30) Foreign Application Priority Data

Jul. 31, 1997 (JP) .................................................. 9-206770

(51) Int. Cl.[7] .......................... C09K 19/12; C09K 19/20; F21V 9/00; G03H 1/04
(52) U.S. Cl. .................. 252/299.66; 252/299.67; 252/582; 430/1; 430/2
(58) Field of Search ................. 252/299.01, 582, 252/299.66, 299.67; 430/1, 2

(56) References Cited

U.S. PATENT DOCUMENTS

| | | | |
|---|---|---|---|
| 5,354,498 | * 10/1994 | Akashi et al. | 252/299.01 |
| 5,558,813 | * 9/1996 | Akashi et al. | 252/299.01 |
| 5,560,864 | * 10/1996 | Goulding | 252/299.01 |
| 5,679,414 | * 10/1997 | Akashi et al. | 428/1 |
| 5,707,543 | * 1/1998 | Akashi et al. | 252/299.01 |
| 5,709,911 | * 1/1998 | Onishi et al. | 428/1 |
| 5,720,900 | * 2/1998 | Parri et al. | 252/299.66 |
| 5,750,051 | * 5/1998 | Goulding et al. | 252/299.65 |
| 5,762,823 | * 6/1998 | Hikmet | 252/299.01 |
| 5,769,393 | * 6/1998 | Kobayashi et al. | 252/299.01 |
| 5,830,385 | * 11/1998 | Lau et al. | 252/299.01 |
| 5,863,457 | * 1/1999 | Hasebe et al. | 252/299.01 |
| 5,942,157 | * 8/1999 | Sutherland et al. | 252/582 |

FOREIGN PATENT DOCUMENTS

| | | |
|---|---|---|
| 7-13140 | 1/1995 | (JP) . |
| 8-313729 | 11/1996 | (JP) . |
| 9-208957 | 8/1997 | (JP) . |
| 2772960 | 4/1998 | (JP) . |

* cited by examiner

*Primary Examiner*—C. H. Kelly
(74) *Attorney, Agent, or Firm*—Oblon, Spivak, McClelland, Maier & Neustadt, P.C.

(57) ABSTRACT

High molecular liquid crystal obtained by photopolymerizing a liquid crystal composition which comprises $CH_2$=$CHCOO$—$X$—$OC_6H_4$—$C_6H_4CN$ (X is an alkylene group) and $CH_2$=$CHCOOC_6H_4$—$C_6H_4CN$. An optical element which is a polarized hologram element made by using the high molecular liquid crystal and an optical head having the polarized hologram element as a beam splitter.

14 Claims, 1 Drawing Sheet

LIQUID-CRYSTAL COMPOSITION AND POLYMERIC LIQUID CRYSTAL OBTAINED BY POLYMERIZING THE SAME

BACKGROUND OF THE INVENTION

The present invention relates to a liquid crystal composition which comprises acrylic acid derivative compounds, and high molecular liquid crystal obtained by polymerizing it.

DESCRIPTION OF THE BACKGROUND

A photopolymerizable liquid crystal monomer having photopolymerizable functional groups imparted to a liquid crystal monomer, has both characteristics as a monomer and characteristics as liquid crystal. Therefore, when a photopolymerizable liquid crystal monomer is irradiated with light in the aligned state, it undergoes polymerization as aligned, and a polymer having a fixed alignment can be obtained. The high molecular liquid crystal thus obtained has an optical anisotropy based on the refractive index anisotropy of liquid crystal skeleton, and has special properties imparted by controlling liquid crystal alignment conditions. Accordingly, applications to e.g. a phase shift film or an optical head to be used for an optical head device are desired.

An optical head device is a device wherein light from a light source is converged on an optical disk to write information on the optical disk, or reflected light from the optical disk is received on a light-receiving element to read information on the optical disk. The optical head to be used for it functions as a beam splitter.

Heretofore, as an optical head, one having isotropic diffraction gratings formed on glass or plastic obtained by forming rectangular gratings (relief type) by dry etching or injection molding, or one obtained by forming anisotropic diffraction gratings on crystal surface showing refractive index anisotropy and combining a 1/4 wavelength plate therewith to obtain polarization selectivity, has been known.

However, with regard to the isotropic diffraction gratings, the incoming utilization efficiency is about 50% and the outgoing utilization efficiency is about 20%. Accordingly, it is limited to about 10% for incoming and outgoing, and the incoming and outgoing efficiency tends to be low, such being problematic.

On the other hand, with regard to a method wherein using a plate of crystal showing a refractive index anisotropy such as $LiNbO_3$, anisotropic diffraction gratings are formed on the surface to obtain polarization selectivity, and high incoming and outgoing efficiency is utilized, the crystal showing the refractive index anisotropy is expensive itself, and its application to the field of home uses is difficult. Further, in the case of forming the gratings by a proton exchange method, in general, protons in the proton exchange liquid are likely to diffuse into the $LiNbO_3$ substrate, and thus there is a problem that it is difficult to form the gratings having a small pitch.

In the case of using a photopolymerizable liquid crystal monomer, by making it high molecular liquid crystal after controlling liquid crystal alignment conditions, high incoming and outgoing efficiency as crystal showing a refractive index anisotropy can be obtained. For example, there is a method to fill the high molecular liquid crystal into the gratings to obtain high efficiency. In the method, in a liquid crystal cell having the surface of one side of the substrate fine-processed to form rectangular gratings, a liquid crystal monomer is aligned so that the major axis direction of the liquid crystal monomer is parallel to the gratings, followed by polymerization to obtain high molecular liquid-crystal. By optimizing grating depth so that the normal light refractive index of the high molecular liquid crystal is equal to the refractive index of the grating substrate, high incoming and outgoing efficiency can be obtained.

Theoretically, the maximum incoming and outgoing efficiency can be obtained when the formula $\lambda/2 = \Delta n \cdot d$ is satisfied where d is the grating depth, $\Delta n$ is the refractive index anisotropy of the high molecular liquid crystal and $\lambda$ is the wavelength, and high light utilization efficiency can be obtained with ± first order diffracted light efficiency of about 40%, and with a total of about 80%.

As another example, a method wherein high molecular liquid crystal is filled into a liquid crystal cell having transparent electrodes patterned into stripes, to obtain high efficiency, may be mentioned. The liquid crystal monomer is aligned in the substrate face so that the major axis direction is perpendicular to the stripe directions, voltage is applied thereto, and the liquid crystal monomer sandwiched between the top and bottom transparent electrodes is aligned on the substrate face so that it is perpendicular to the substrate face. The alignment conditions are controlled periodically at a part where the electrode exists and a part where it does not exist, and polymerization is conducted to obtain high molecular liquid crystal. In this case too, the maximum incoming and outgoing efficiency can be obtained when $\lambda/n = \Delta n \cdot d$ is satisfied.

As the material for high molecular liquid crystal is cheap, it can be applied to home uses, and it is expected as an excellent optical head. As the characteristics of the optical head, high durability and high incoming and outgoing efficiency at a fine pitch (10 μm or shorter) are required.

As the photopolymerizable liquid crystal monomer, for example, a compound represented by the formula 3, the formula 4 or the formula 5:

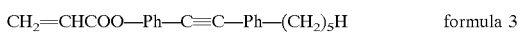  formula 3

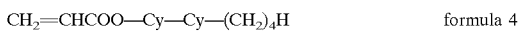  formula 4

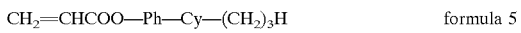  formula 5 wherein Ph is a 1,4-phenylene group and Cy is a trans-1,4-cyclohexylene group, has been known (Takatsu and Hasebe, text from the 106th photopolymer symposium, III-1).

However, there are problems that the compound represented by the formula 3 (hereinafter referred to as compound 3, and the same applies to the other) has a tolan group in the molecule, and thus it does not have durability.

Further, with regard to the compound 4 and the compound 5, the monomer has a small refractive index anisotropy of at most 0.1, and thus the refractive index anisotropy of the liquid crystal composition comprising it can not be made high, such being problematic. Further, as the refractive index anisotropy of high molecular liquid crystal decreases to about half after polymerization, in the case of using a compound having a low refractive index anisotropy as the main component of the liquid crystal composition, it is difficult to make fine pitch while keeping a high incoming and outgoing efficiency, such being problematic.

Namely, in the case of filling high molecular liquid crystal into the gratings, when the wavelength is 0.65 μm, the grating depth of at least 3 μm is required when the refractive index anisotropy is less than 0.1. However, the fine-process of the gratings having a large aspect ratio is very difficult. Further, in the case of conducting the alignment control by the electric field by using the patterned transparent electrodes, as the alignment of liquid crystal at the part where no electrode pattern exists is disturbed by influences of the leakage electric field, it tends to be difficult to control the alignment when the aspect ratio is large.

Accordingly, in order to make a fine pitch, it is required that the refractive index anisotropy of high molecular liquid crystal is at least 0.1.

DISCLOSURE OF THE INVENTION

The present invention provides a liquid crystal composition having an excellent durability and a high refractive index anisotropy, i.e. a liquid crystal composition which comprises a compound represented by the following formula 1 and a compound represented by the following formula 2, and high molecular liquid crystal obtained by polymerizing it:

$$CH_2=CHCOO—X—O—Ph—Ph—CN \quad \text{formula 1}$$

$$CH_2=CHCOO—Ph—Ph—CN \quad \text{formula 2}$$

wherein X is an alkylene group, and Ph is a 1,4-phenylene group. Ph is a 1,4-phenylene group also in the formulae 7 to 10.

Figure 1:
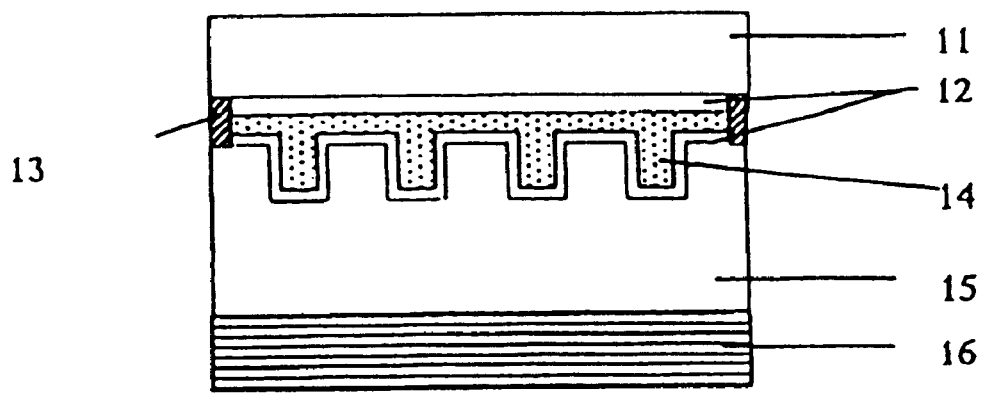
FIG. 1 is a cross-sectional view illustrating a high molecular liquid crystal polarized hologram beam splitter using a grating substrate.

11 is a glass plate substrate, 12 is an alignment film, 13 is an adhesive, 14 is high molecular liquid crystal, 15 is a glass grating substrate, 16 is a 1/4 wavelength plate, 21 is a glass plate substrate, 22 is a transparent electrode, 23 is an alignment film, 24 is an adhesive, 25 is a transparent electrode, 26 is a glass plate substrate, 27 is high molecular liquid crystal aligned in parallel, 28 is high molecular liquid crystal aligned in perpendicular and 29 is a 1/4 wavelength plate.

BEST MODE FOR CARRYING OUT THE INVENTION

Each of the compound 1 and the compound 2 is a liquid crystal monomer having durability without a tolan group in the molecule. Further, the refractive index anisotropy of the monomer shows at least 0.2, and the refractive index anisotropy of the photopolymerizable liquid crystal composition comprising them as the main component becomes high. Therefore, high molecular liquid crystal having the refractive index anisotropy of at least 0.1 after polymerization can be obtained.

In the compound 1, if the carbon number of X is too many, the temperature showing the liquid crystal property tends to be too low. Accordingly, X is preferably an alkylene group having a carbon number of from 2 to 7. Further, in order to obtain a wide range of temperature showing the liquid crystal property, X is preferably a linear alkylene group.

The compound 1 can be synthesized, for example, by a method shown below. ω-bromoalkanol is reacted with 4-hydroxy-4'-cyanobiphenyl in the presence of an alkali, to obtain 4-(ω-hydroxyalkoxy)-4'-cyanobiphenyl. It is reacted with acryloyl chloride in the presence of a base such as triethylamine, to obtain the compound 1.

The compound 2 is a known compound obtainable by reacting hydroxy cyanobiphenyl with acryloyl chloride.

Physical properties of the compounds are shown in Table 1. Here, $T_m$ and $T_c$ represent the melting point (unit: °C.) and the nematic-isotropic phase transition temperature (unit: °C.), respectively.

TABLE 1

|  | X | $T_m$ | $T_c$ |
|---|---|---|---|
| Compound 1 | | | |
| A | $(CH_2)_2$ | 89 | — |
| B | $(CH_2)_3$ | 70 | 35 |
| C | $(CH_2)_4$ | 91 | 40 |
| D | $(CH_2)_5$ | 75 | 55 |
| E | $(CH_2)_6$ | 64 | — |
| Compound 2 | | | |
| F | — | 103 | 129 |

Among A, B, C, D, E and F, only F is enantiotropic liquid crystal, and F has a very high melting point of 103° C. Namely, any liquid crystal itself does not show a stable nematic liquid crystal property at room temperature or around room temperature.

However, the present inventors have found that it becomes possible only by mixing them to make a liquid crystal composition.

When using the compounds as a liquid crystal composition, it is preferred to mix the compound 1 and the compound 2, or mix the compound 1, the compound 2 and another liquid crystal compound, to obtain a liquid crystal composition having desired properties. The total amount of the compound 1 and the compound 2 in the liquid crystal composition is preferably from 30 to 99.9 wt %, particularly preferably from 40 to 90 wt %.

It is preferred that the liquid crystal composition of the present invention further contains a compound represented by the following formula X, in addition to the above-mentioned compounds:

$$CH_2=CHCOO—Ph—OCO—Y—Z \quad \text{formula X}$$

wherein Y is a 1,4-phenylene group or a 1,4-cyclohexylene group and Z is an alkyl group.

The proportion of the compound X in the liquid crystal composition is preferably from 30 to 70 wt %.

The compound X can be synthesized, for example, by a method shown below. Namely, hydroquinone is reacted with acrylic chloride to obtain a compound represented by the formula 13 which is a half ester, and then the compound 13 is reacted with a compound represented by the formula 14 (Y and Z in the formula 14 are as defined in the formula X) to obtain the compound 11.

| | |
|---|---|
| HO-PH-OH | formula 12 |
| ↓ $CH_2=CHCOCl$ | |
| ↓ $N(CH_2CH_3)_3$ | |
| $CH_2=CHCOO-Ph-OH$ | formula 13 |
| ↓ ClCO-Y-Z | formula 14 |
| ↓ $N(CH_2CH_3)_3$ | |
| $CH_2=CHCOO-Ph-OCO-Y-Z$ | formula X |

In the liquid crystal composition, another liquid crystal compound may be contained. Another liquid crystal compound varies depending on applications, required performance or the like, and various additives such as a component showing liquid crystal property at a low temperature, a low viscous component for low temperature, a component adjusting the refractive index anisotropy, a component adjusting the permittivity anisotropy, a component imparting a cholesteric property and a component imparting cross-linking property, may be suitably used.

Further, in the liquid crystal composition, another compound may be contained. The proportion of another compound in the liquid crystal composition is preferably less than 50 wt %. As another compound, a cross-linking monomer such as a diacrylate may be mentioned.

It is more preferred that the liquid crystal composition of the present invention contains at least two kinds of the compound 1, and the compound 2.

In the case of conducting photopolymerization, the photopolymerization initiator may be used to effectively conduct the reaction. The photopolymerization initiator is not particularly limited, and an acetophenone, a benzophenone, a benzoin, a benzyl, a Michler's ketone, a benzoinalkyl ether, a benzyldimethylketal and a thioxanthone may be preferably used. Further, as the case requires, two kinds or more of the photopolymerization initiators may be mixed. The amount of the photopolymerization initiator contained is preferably from 0.1 to 10 wt %, particularly preferably from 0.5 to 2 wt %, based on the liquid crystal composition.

The composition thus prepared is subjected to photopolymerization to form high molecular liquid crystal. As the radiation used for polymerization, ultraviolet rays or visible light may, for example, be mentioned. As a support, glass or plastic may, for example, be used. The support surface is subjected to the alignment treatment.

As the alignment treatment, the support surface may be directly rubbed by natural fibers such as cotton or wool or synthetic fibers such as nylon or polyester, or may be coated with e.g. a polyimide or a polyamide, and the surface is rubbed with the above-mentioned fibers. A spacer such as glass beads is arranged, and the composition is injected and filled in the supports controlled to obtain a desired gap.

In order to keep the liquid crystal composition in the liquid crystal state, the atmospheric temperature may be within a range of from $T_m$ to $T_c$. However, at the temperature close to $T_c$, the refractive index anisotropy is extremely small, and thus the upper limit of the atmospheric temperature is preferably $(T_c-10)°$ C. or lower.

The high molecular liquid crystal prepared by the present invention may be used as sandwiched between the supports, or may be separated from the supports to use.

The refractive index anisotropy of the high molecular liquid crystal of the present invention is at least 0.1.

The high molecular liquid crystal thus prepared is suitable for an optical element. Specifically, it can be used as a phase shift film. Further, by combining a 1/4 wavelength plate with the high molecular weight liquid crystal wherein the alignment is controlled to form gratings, or by combining the 1/4 wavelength plate with one having the high molecular liquid crystal filled in the concave portion of the gratings, a polarized hologram element having a high incoming and outgoing efficiency and polarization dependency, can be constituted. The polarized hologram element is useful as a beam splitter. Accordingly, it is possible to prepare a beam splitter using the element and prepare an optical head having a high light utilization efficiency. Further, in the case of a structure wherein the 1/4 wavelength is not combined, a polarized hologram element with an excellent temperature property can be prepared.

EXAMPLES

Example 1

(Synthesis of the compound 1)

To 400 ml of a methanol solution having 5.7 wt % potassium hydroxide, 50 g of the compound 6 and 49.1 g of 4-hydroxy-4'-cyanobiphenyl were added, followed by reflux. After they were completely reacted, water and dichloromethane were added thereto, and the organic layer was extracted. Then, saturated aqueous sodium chloride was added thereto, and the organic layer was extracted, followed by washing with water. Anhydrous magnesium sulfate was added thereto, the mixture was subjected to filtration under reduced pressure, and the filtrate was extracted. The filtrate was subjected to column chromatography by using dichloromethane as a developing solution, and dichloromethane was distilled off at 30° C. to obtain powder crystals. n-Hexane was added thereto to conduct recrystallization, and 40.0 g of the compound 7, i.e. 4-(3-hydroxypropyloxy)-4'-cyanobiphenyl was obtained.

Then, to a mixture comprising 500 ml of dichloromethane, 29.9 g of triethylamine and 40.0 g of the compound 7, 21.5 g of acryloyl chloride was added under cooling with ice water, so that the temperature of the reaction solution did not exceed 20° C. After the mixture was stirred and reacted adequately, hydrochloric acid and water were added to the reaction solution, and the organic layer was extracted. Saturated aqueous sodium chloride was added thereto, and the organic layer was extracted followed by washing with water. Anhydrous magnesium sulfate was added thereto, followed by filtration under reduced pressure. The filtrate was subjected to column chromatography by using dichloromethane as a developing solution, dichloromethane was distilled off at 30° C., to obtain powder crystals. n-Hexane was added thereto to conduct recrystallization, and 18.0 g of the above-mentioned compound of B, i.e. 4-[3-(propenoyloxy)propyloxy]-4'-cyanobiphenyl (melting point 70° C.) as a white crystal was obtained.

By employing the same synthesis methods, the above-mentioned compound of C (4-[4-(propenoyloxy)butyloxy]-4'-cyanobiphenyl), the above-mentioned compound of D (4-[5-(propenoyloxy)pentyloxy]-4'-cyanobiphenyl), the above-mentioned compound of E (4-[6-(propenoyloxy) hexyloxy]-4'-cyanobiphenyl) and the above-mentioned compound of A (4-[2-(propenoyloxy)ethyloxy]-4'-cyanobiphenyl) were obtained.

    formula 6

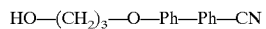    formula 7

Example 2

17 wt % of the compound 2 (4-propenoyloxy-4'-cyanobiphenyl), 36 wt % of the above-mentioned compound of B and 47 wt % of the above-mentioned compound of D were mixed, respectively.

The liquid crystal composition was nematic liquid crystal having a $T_m$ of 45° C. and a $T_c$ of 52° C. The refractive index anisotropy was 0.245 at 589 nm at 46° C.

Example 3

24 wt % of the compound 2, 27 wt % of the above-mentioned compound of D, 24 wt % of the compound 8 (4-(4'-n-butylphenylcarbonyloxy)phenylacrylate) and 25 wt % of the compound 9 (4-(4'-n-pentylphenylcarbonyloxy) phenylacrylate) were mixed.

The liquid crystal composition was a nematic liquid crystal having a $T_m$ of 39° C. and a $T_c$ of 73° C. The refractive index anisotropy was 0.204 at 589 nm at 40° C.

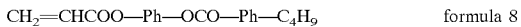

CH$_2$=CHCOO—Ph—OCO—Ph—C$_4$H$_9$     formula 8

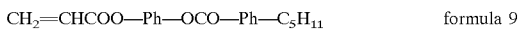

CH$_2$=CHCOO—Ph—OCO—Ph—C$_5$H$_{11}$     formula 9

Example 4

A polyimide as an alignment agent was coated on the glass plates by a spin coater, followed by heat treatment, and a rubbing treatment was conducted by a nylon cloth in a predetermined direction, to prepare supports. Two sheets of the supports were bonded by an adhesive so that the alignment-treated surfaces faced each other. Glass beads were mixed in the adhesive, and the gap was adjusted so that the space between the supports was 10 μm.

To the cell thus prepared, one having 0.5 wt % of ylgacure 907 (produced by Ciba Geigy) as a photopolymerization initiator added to the liquid crystal composition of Example 3, was injected at a temperature of 80° C. Ultraviolet rays with a wavelength of 360 nm were irradiated thereon at 40° C., to conduct photopolymerization. After polymerization, a polymer in the form of a film was obtained. The polymer was high molecular liquid crystal which was aligned in parallel to the rubbing directions of the substrate, and which had a refractive index anisotropy of 0.124 at 589 nm. The polymer was transparent in a visible range, and no scattering was observed.

Example 5

One having rectangular gratings with a pitch of 6 μm and a depth of 2.9 μm formed on a glass substrate, a polyimide as an alignment agent coated thereon by a spin coater followed by heat treatment, and rubbing treatment applied in parallel to the grating directions by a nylon cloth; and a glass plate substrate having alignment treatment applied in the same manner, were bonded by using an adhesive, so that the alignment-treated surfaces faced each other. The alignment directions were made parallel.

To the cell thus prepared, one having 0.5 wt % of ylgacure 907 (produced by Ciba Geigy) as a photopolymerization initiator added to the liquid crystal composition of Example 3, was injected at 80° C., and the concave portion of the gratings was filled with the above-mentioned composition. Ultraviolet rays with a wavelength of 360 nm were irradiated thereon at 40° C., to conduct photopolymerization. A 1/4 wavelength plate was laminated on one side of the cell to prepare a polarized hologram element, which is shown in FIG. 1. When the polarized hologram element is used for an optical head as a beam splitter, a light utilization efficiency was obtained with a total of each ± first order diffracted light efficiency of 60% by a laser light source with a wavelength of 650 nm.

Example 6

25 wt % of the compound 2, 25 wt % of the above-mentioned compound of B, 25 wt % of the compound 8 and 25 wt % of the compound 9 were mixed.

The liquid crystal composition was a nematic liquid crystal having a $T_m$ of 34° C. and a $T_c$ of 68° C. The refractive index anisotropy was 0.200 at 589 nm at 35° C.

Example 7

To a cell prepared in the same manner as in Example 4, one having 1 wt % of ylgacure 907 (produced by Ciba Geigy) as a photopolymerization initiator added in the liquid crystal composition of Example 6, was injected at 70° C. Ultraviolet rays with a wavelength of 360 nm were irradiated thereon at 35° C., to conduct photopolymerization. After polymerization, a polymer in the form of a film was obtained. The polymer was high molecular liquid crystal which was aligned in parallel to the rubbing directions of the substrate, and which had a refractive index anisotropy of 0.120 at 589 nm. The polymer was transparent in a visible range, and no scattering was observed.

Example 8

One having a polyimide as an alignment agent coated on a glass plate which comprises, on the surface, ITO transparent electrodes having a pitch processed to 8 μm by a spin coater followed by heat treatment, and rubbing treatment applied perpendicular to the grating directions by a nylon cloth; and a glass plate having alignment treatment applied in the same manner, were bonded by using an adhesive, so that the alignment-treated surfaces faced each other. The grating electrode part was laid one on another, and the cell gap was made 3 μm by using a spacer.

Figure 2:
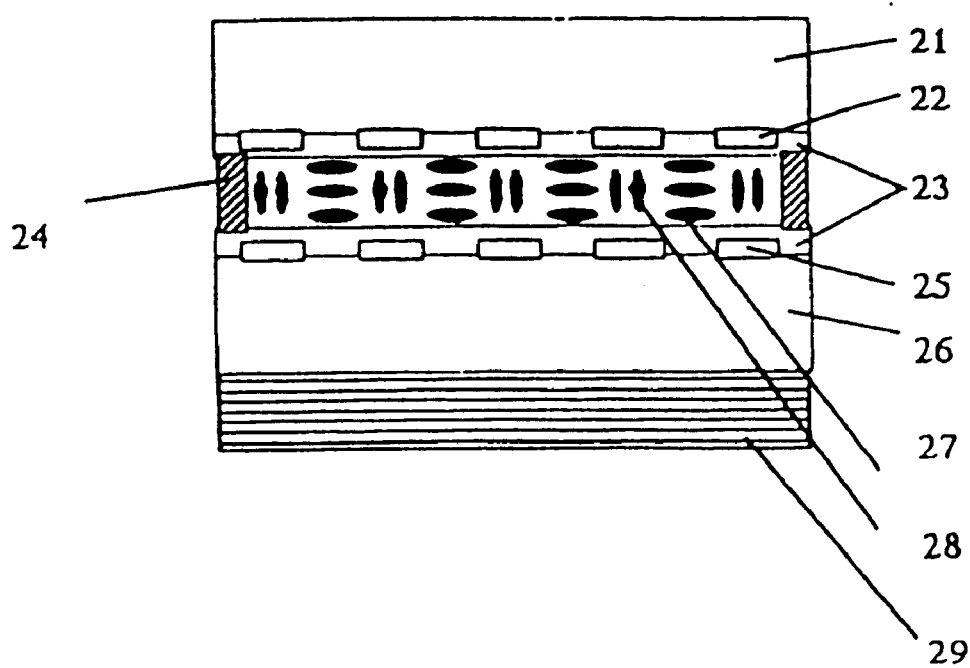
FIG. 2 is a cross-sectional view illustrating a high molecular liquid crystal polarized hologram beam splitter using cyclic electrodes.

One having 1 wt % of ylgacure 907 (produced by Ciba Geigy) as a photopolymerization initiator and 5 wt % of the compound 10 (4,4'-bis(acryloyloxy)biphenyl) as a cross-linking agent added to the liquid crystal composition of Example 6 was prepared, which was then injected to the above-mentioned cell at 70° C. Ultraviolet rays with a wavelength of 360 nm were irradiated at 35° C. applying a voltage of 5V$_{rms}$ at 100 Hz, to conduct photopolymerization, and high molecular liquid crystals which were aligned in parallel with one another and high molecular liquid crystals which were aligned in perpendicular with one another were periodically formed. The 1/4 wavelength plate was laminated on one side of the cell, to prepare a polarized hologram element, which is shown in FIG. 2. When the polarized hologram element was used for an optical head as a beam splitter, a light utilization efficiency was obtained with a total of each ± first order diffracted light efficiency of 40% by a laser light source with a wavelength of 650 nm was obtained.

CH$_2$=CHCOO—Ph—Ph—OCOCH=CH$_2$     formula 10

INDUSTRIAL APPLICABILITY

According to the present invention, a photopolymerizable liquid crystal composition having an excellent durability and a large value of refractive index anisotropy, and high molecular liquid crystal can be prepared. The high molecular liquid crystal obtained by photopolymerization can be used for a phase difference film or an optical head.

The present invention can be applied in various ways within a range of not impairing the effects of the present invention.

What is claimed is:

1. A liquid crystal composition, comprising:
   a compound of formula 1, a compound of formula 2, and a compound of formula X:

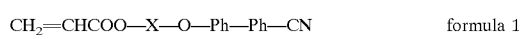

CH$_2$=CHCOO—X—O—Ph—Ph—CN     formula 1

CH$_2$=CHCOO—Ph—Ph—CN     formula 2

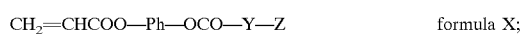

CH$_2$=CHCOO—Ph—OCO—Y—Z     formula X;

wherein substituent X is alkylene, Ph is 1,4-phenylene, Y is 1,4-phenylene or 1,4-cyclohexylene, and Z is alkyl.

2. The liquid crystal composition of claim 1, wherein substituent X is a $C_{2-7}$ linear alkylene.

3. The liquid crystal composition of claim 1, wherein a total amount of the compound of formula 1 and the compound of formula 2 is from 30 to 70% by weight, and an amount of the compound of formula X is from 30 to 70% by weight based on a total weight of said liquid crystal composition.

4. The liquid crystal composition of claim 2, wherein a total amount of the compound of formula 1 and the compound of formula 2 is from 30 to 70% by weight, and an amount of the compound of formula X is from 30 to 70% by weight based on a total weight of said liquid crystal composition.

5. A polymeric liquid crystal obtained by polymerizing the liquid crystal composition of claim 1.

6. The polymeric liquid crystal of claim 5, wherein said polymerizing occurs by irradiating with ultraviolet rays or visible light.

7. The polymeric liquid crystal of claim 6, wherein said polymeric liquid crystal has a refractive index anisotropy of at least 0.1.

8. An optical element, comprising: the polymeric liquid crystal of claim 5.

9. The optical element of claim 8, wherein said optical element is a polarized hologram element.

10. An optical head, comprising:

the polarized hologram element according to claim 9 as a beam splitter.

11. An optical element, comprising:

a polymeric liquid crystal obtained by polymerizing a liquid crystal composition comprising a compound of formula 1 and a compound of formula 2:

$$CH_2\!=\!CHCOO\!-\!X\!-\!O\!-\!Ph\!-\!Ph\!-\!CN \qquad \text{formula 1}$$

$$CH_2\!=\!CHCOO\!-\!Ph\!-\!Ph\!-\!CN \qquad \text{formula 2}$$

wherein X is alkylene, and Ph is 1,4-phenylene;

wherein said optical element is a polarized hologram element.

12. An optical head, comprising:

the polarized hologram element according to claim 11 as a beam splitter.

13. An optical element, comprising:

a polymeric liquid crystal obtained by polymerizing a liquid crystal composition comprising a compound of formula 1, a compound of formula 2 and a compound of formula X:

$$CH_2\!=\!CHCOO\!-\!X\!-\!O\!-\!Ph\!-\!Ph\!-\!CN \qquad \text{formula 1}$$

$$CH_2\!=\!CHCOO\!-\!Ph\!-\!Ph\!-\!CN \qquad \text{formula 2}$$

$$CH_2\!=\!CHCOO\!-\!Ph\!-\!OCO\!-\!Y\!-\!Z \qquad \text{formula X;}$$

wherein said optical element is a polarized hologram element.

14. An optical head, comprising:

the polarized hologram element according to claim 13 as a beam splitter.

\* \* \* \* \*